US010635735B2

(12) United States Patent
Liu et al.

(10) Patent No.: US 10,635,735 B2
(45) Date of Patent: Apr. 28, 2020

(54) METHOD AND APPARATUS FOR DISPLAYING INFORMATION

(71) Applicant: Baidu Online Network Technology (Beijing) Co., Ltd., Beijing (CN)

(72) Inventors: Xuechao Liu, Beijing (CN); Biao Han, Beijing (CN); Xiaobing Zhu, Beijing (CN); Huafeng Sun, Beijing (CN); Xiao Wang, Beijing (CN); Qingming He, Beijing (CN); Hao Lv, Beijing (CN)

(73) Assignee: Baidu Online Network Technology (Beijing) Co., Ltd, Beijing (CN)

( * ) Notice: Subject to any disclaimer, the term of this patent is extended or adjusted under 35 U.S.C. 154(b) by 83 days.

(21) Appl. No.: 16/133,287

(22) Filed: Sep. 17, 2018

(65) Prior Publication Data

US 2019/0114365 A1 Apr. 18, 2019

(30) Foreign Application Priority Data

Oct. 17, 2017 (CN) .......................... 2017 1 0966242

(51) Int. Cl.
G06K 19/06 (2006.01)
G06F 16/955 (2019.01)
G06F 16/958 (2019.01)

(52) U.S. Cl.
CPC ........ G06F 16/9566 (2019.01); G06F 16/958 (2019.01); G06K 19/06037 (2013.01)

(58) Field of Classification Search
CPC .............. G06F 16/9566; G06F 16/958; G06K 19/06037
USPC ....................................................... 709/217
See application file for complete search history.

(56) References Cited

U.S. PATENT DOCUMENTS 9,953,015 B2 * 4/2018 Bhandari ................ G06F 3/048
2004/0205514 A1 * 10/2004 Sommerer ............ G06F 40/106
715/205
2011/0213655 A1 * 9/2011 Henkin .................. G06Q 30/00
705/14.49

FOREIGN PATENT DOCUMENTS

CN 105100214 A 11/2015
CN 106294770 A 1/2017
EP 1335306 A2 8/2003

* cited by examiner

Primary Examiner — Tu T Nguyen
(74) Attorney, Agent, or Firm — Knobbe, Martens, Olson & Bear, LLP

(57) ABSTRACT

Embodiments of the disclosure disclose a method and apparatus for displaying information. The method comprises: acquiring to-be-displayed information; generating a URL of a target page, the target page including a hyperlink linking to a display page of the to-be-displayed information; sending the URL to a first terminal device, the first terminal device used for generating and displaying a QR code of the URL; determining, in response to receiving an information display request sent by a second terminal device for characterizing the second terminal device recognizing the QR code, whether the information display request meets a preset condition; and sending a page display instruction to the second terminal device, in response to determining the information display request meeting the preset condition, wherein the second terminal device displays the target page in response to receiving the page display instruction and displays the to-be-displayed information in response to the hyperlink being clicked.

11 Claims, 7 Drawing Sheets

METHOD AND APPARATUS FOR DISPLAYING INFORMATION

CROSS-REFERENCE TO RELATED APPLICATIONS

This application is related to and claims priority from Chinese Application No. 201710966242.X, filed on Oct. 17, 2017 and entitled "Method and Apparatus for Displaying Information," the entire disclosure of which is hereby incorporated by reference.

TECHNICAL FIELD

Embodiments of the disclosure relate to the field of computer technology, specifically to the field of Internet technology, and more specifically to a method and apparatus for displaying information.

BACKGROUND

With the development of computer technology, information propagating service is increasingly diversified. In order to improve the diversity of information display, it is usually necessary to insert pushed messages (such as texts, images, and videos) into social media pages updating one's friend circle and the information display pages. The pushed messages are often called feed information.

SUMMARY

An objective of the embodiments of the disclosure is to propose a method and apparatus for displaying information.

In a first aspect, an embodiment of the disclosure provides a method for displaying information. The method includes: acquiring to-be-displayed information; generating a uniform resource locator (URL) of a target page, the target page including a hyperlink linking to a display page of the to-be-displayed information; sending the URL to a first terminal device, the first terminal device used for generating a quick response (QR) code of the URL and displaying the QR code; determining, in response to receiving an information display request sent by a second terminal device for characterizing the second terminal device recognizing the QR code, whether the information display request meets a preset condition; and sending a page display instruction to the second terminal device, in response to determining the information display request meeting the preset condition, wherein the second terminal device displays the target page in response to receiving the page display instruction and displays the to-be-displayed information in response to the hyperlink being clicked.

In some embodiments, the information display request includes an application identifier of an application recognizing the QR code, and sending time of sending the information display request by the second terminal device; and the preset condition includes: the sending time being within a preset time range and the application identifier being a preset application identifier.

In some embodiments, after the determining the information display request meeting a preset condition, and before the sending a page display instruction to the second terminal device in response to determining the information display request meeting the preset condition, the method further includes: determining an information display format of the application; and converting a format of the to-be-displayed information into the information display format.

In some embodiments, the sending a page display instruction to the second terminal device, in response to determining the information display request meeting the preset condition includes: sending the page display instruction to the second terminal device, in response to determining the information display request meeting the preset condition, and in response to receiving a refresh request characterizing the second terminal device performing a refresh operation.

In some embodiments, after the sending a page display instruction to the second terminal device, the method further includes: sending an instruction deleting the to-be-displayed information to the second terminal device.

In a second aspect, an embodiment of the disclosure provides an apparatus for displaying information. The apparatus includes: an acquiring unit, configured for acquiring to-be-displayed information; a generating unit, configured for generating a URL of a target page, the target page including a hyperlink linking to a display page of the to-be-displayed information; a first sending unit, configured for sending the URL to a first terminal device, wherein the first terminal device is used for generating a quick response (QR) code of the URL and displaying the QR code; a first determining unit, configured for determining, in response to receiving an information display request sent by a second terminal device for characterizing the second terminal device recognizing the QR code, whether the information display request meets a preset condition; and a second sending unit, configured for sending a page display instruction to the second terminal device, in response to determining the information display request meeting the preset condition, wherein the second terminal device displays the target page in response to receiving the page display instruction and displays the to-be-displayed information in response to the hyperlink being clicked.

In some embodiments, the information display request includes an application identifier of an application recognizing the QR code, and sending time of sending the information display request by the second terminal device; and the preset condition includes: the sending time being within a preset time range and the application identifier being a preset application identifier.

In some embodiments, the apparatus further includes: a second determining unit, configured for determining an information display format of the application; and a conversion unit, configured for converting a format of the to-be-displayed information into the information display format.

In some embodiments, the second determining unit includes: a sending module, configured for sending the page display instruction to the second terminal device, in response to determining the information display request meeting the preset condition, and in response to receiving a refresh request characterizing the second terminal device performing a refresh operation.

In some embodiments, the apparatus further includes: a third sending unit, configured for sending an instruction deleting the to-be-displayed information to the second terminal device.

In a third aspect, an embodiment of the disclosure provides a server for processing information, including: one or more processors; and a memory for storing one or more programs, where the one or more programs, when executed by the one or more processors, cause the one or more processors to implement the method according to any one embodiment of the method for processing information.

In a fourth aspect, an embodiment of the disclosure provides a computer readable storage medium storing a computer program therein, where the program, when executed by a processor, implements the method according to any one embodiment of the method for processing information.

The method and apparatus for displaying information provided by the embodiments of the disclosure acquire to-be-displayed information; then generate a URL of a target page, then send the URL to a first terminal device to generate a QR code, then determine, in response to receiving an information display request sent by a second terminal device for characterizing the second terminal device recognizing the QR code, whether the information display request meets a preset condition, send a page display instruction to the second terminal device to display the target page if determining the information display request meeting the preset condition, and display the to-be-displayed information by the second terminal device in response to the hyperlink being clicked, thereby improving the flexibility in displaying information.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
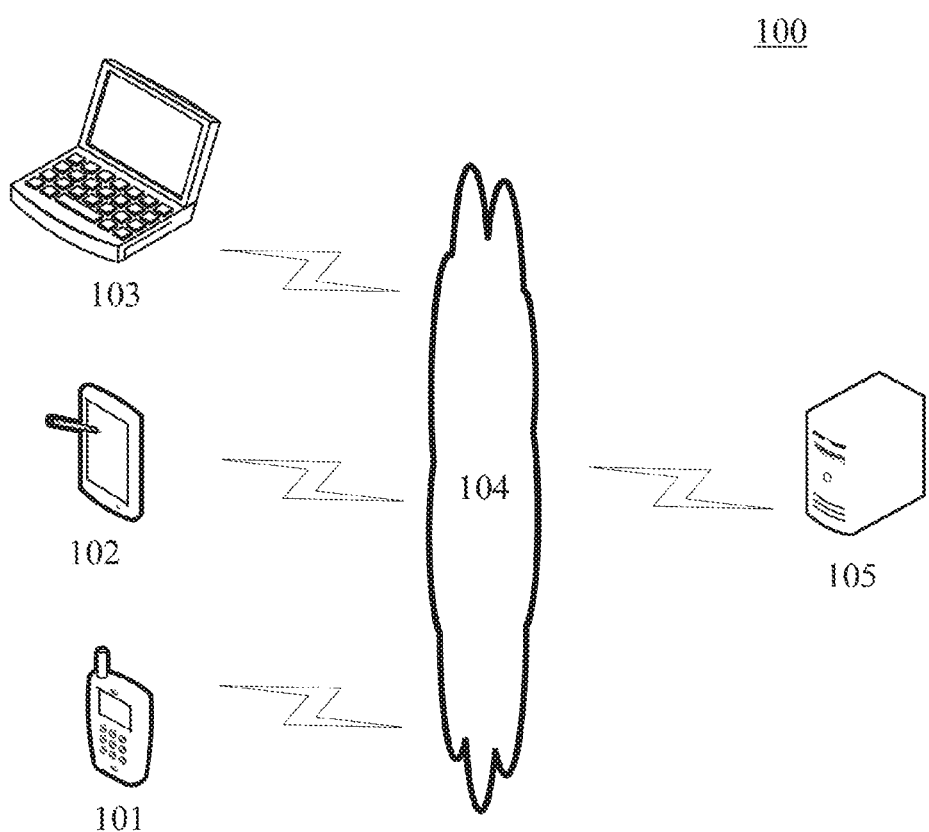
FIG. 1 is an architectural diagram of a system in which some embodiments of the present disclosure may be implemented.

FIG. 1 shows an architecture of a system 100 which may be used by a method for displaying information or an apparatus for displaying information according to the embodiments of the present disclosure.

As shown in FIG. 1, the system architecture 100 may include terminal devices 101, 102 and 103, a network 104, and a server 105. The network 104 serves as a medium providing a communication link between the terminal devices 101, 102 and 103, and the server 105. The network 104 may include various types of connections, such as wired or wireless transmission links, or optical fibers.

The user may use the terminal devices 101, 102 and 103 to interact with the server 105 through the network 104, to receive or transmit messages. Various client applications, such as webpage browsers, search applications, instant messaging tools, information applications, and social platform software may be installed on the terminal devices 101, 102 and 103.

The terminal devices 101, 102 and 103 may be various electronic devices having display screens and supporting information display, including but not limited to, smart phones, tablet computers, laptop computers, electronic readers and desktop computers.

The server 105 may be a server providing various services, for example, a backend information processing server that provides support for information displayed on the terminal devices 101, 102 and 103. The backend information processing server may perform a processing including analyzing data such as the received information display request, and return the processing result (e.g., the to-be-displayed information or display information suitable for the terminal devices 101, 102 and 103 display) to the terminal devices.

It should be noted that the method for displaying information according to the embodiments of the present disclosure is generally executed by the server 105. Accordingly, an apparatus for displaying information is generally installed on the server 105.

It should be appreciated that the numbers of the terminal devices, the networks, and the servers in FIG. 1 are merely illustrative. Any number of terminal devices, networks, and servers may be provided based on the actual requirements.

Figure 2:
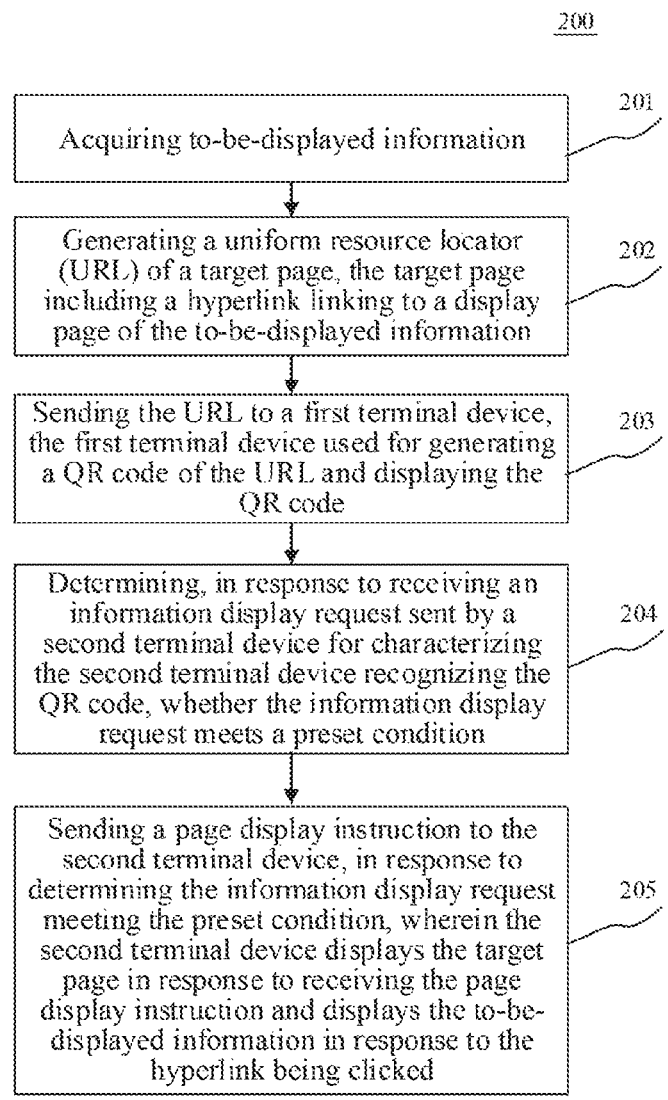
FIG. 2 is a flowchart of an embodiment of a method for displaying information according to the disclosure.

Please further refer to FIG. 2, FIG. 2 shows a flow 200 of an embodiment of a method for displaying information according to the disclosure. The method for displaying information includes the following steps.

Step 201: acquiring to-be-displayed information.

In the embodiment, an electronic device (e.g., the server shown in FIG. 1) in which the method for displaying information is performed may acquire to-be-displayed information. Here, the to-be-displayed information may be information edited and inputted by a user, and selected by the user for browsing. The to-be-displayed information may be sent by the user to the electronic device through a terminal device, or pre-stored in the electronic device.

As an example, on a first terminal device (for example, a computer) of the user, a to-be-displayed information list may be displayed, and each piece of the to-be-displayed information may correspond to a confirmation key (such as a preview key, a determination key, or a display key). The confirmation key being clicked means that the clicked to-be-displayed information is selected. Then the electronic device can acquire the selected to-be-displayed information.

Optionally, a display identifier may be set for each piece of to-be-displayed information. Here, the display identifier is used for uniquely identifying the to-be-displayed information. It should be noted that, the generation of the identifier of the to-be-displayed information is not limited in the embodiment, as long as the identifier can uniquely identify the to-be-displayed information.

Step 202: generating a uniform resource locator (URL) of a target page, the target page including a hyperlink linking to a display page of the to-be-displayed information.

In the embodiment, the electronic device may generate a URL of the target page, wherein the target page includes a hyperlink linking to a display page of the to-be-displayed information. Here, the hyperlink may be displayed as a paragraph of text or an image. When the hyperlink is clicked, a link target (e.g., the display page in the embodiment of the disclosure) may be displayed, and operations, such as opening or running (e.g., if the link target is a web page, then an opening operation may be performed; and if the link target is an application, then an running operation may be performed) may be performed based on a type of the link target. Optionally, the to-be-displayed information may further include a hyperlink. As will be appreciated, a subsequent process after displaying the to-be-displayed information may be verified by clicking the hyperlink included in the to-be-displayed information. As an example, an application invoking behavior after clicking a hyperlink (for example, whether the application can properly start and run after the hyperlink is clicked) under different operating systems may be verified, and loading performance of a landing page (e.g., whether the page can be loaded normally after the hyperlink is clicked) in different network environments may be verified.

Figure 3A:
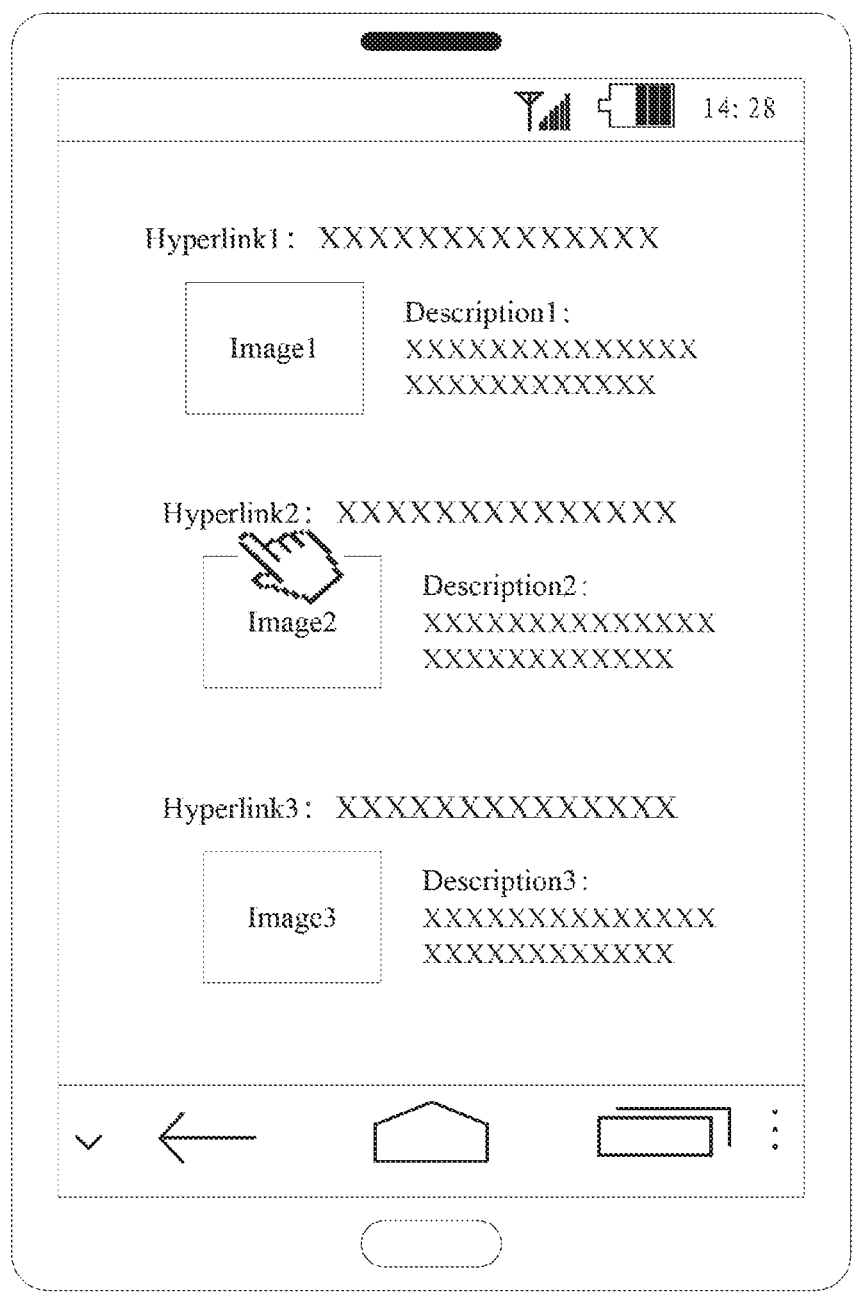
FIG. 3A is a schematic diagram of a target page of the method for displaying information according to the disclosure.

Please refer to FIG. 3A, FIG. 3A shows a schematic diagram of a target page of the method for displaying information according to the disclosure. Here, characters "hyperlink 2" included in the target page may be associated with a link, and the link may link to a display page of the to-be-displayed information.

Figure 3B:
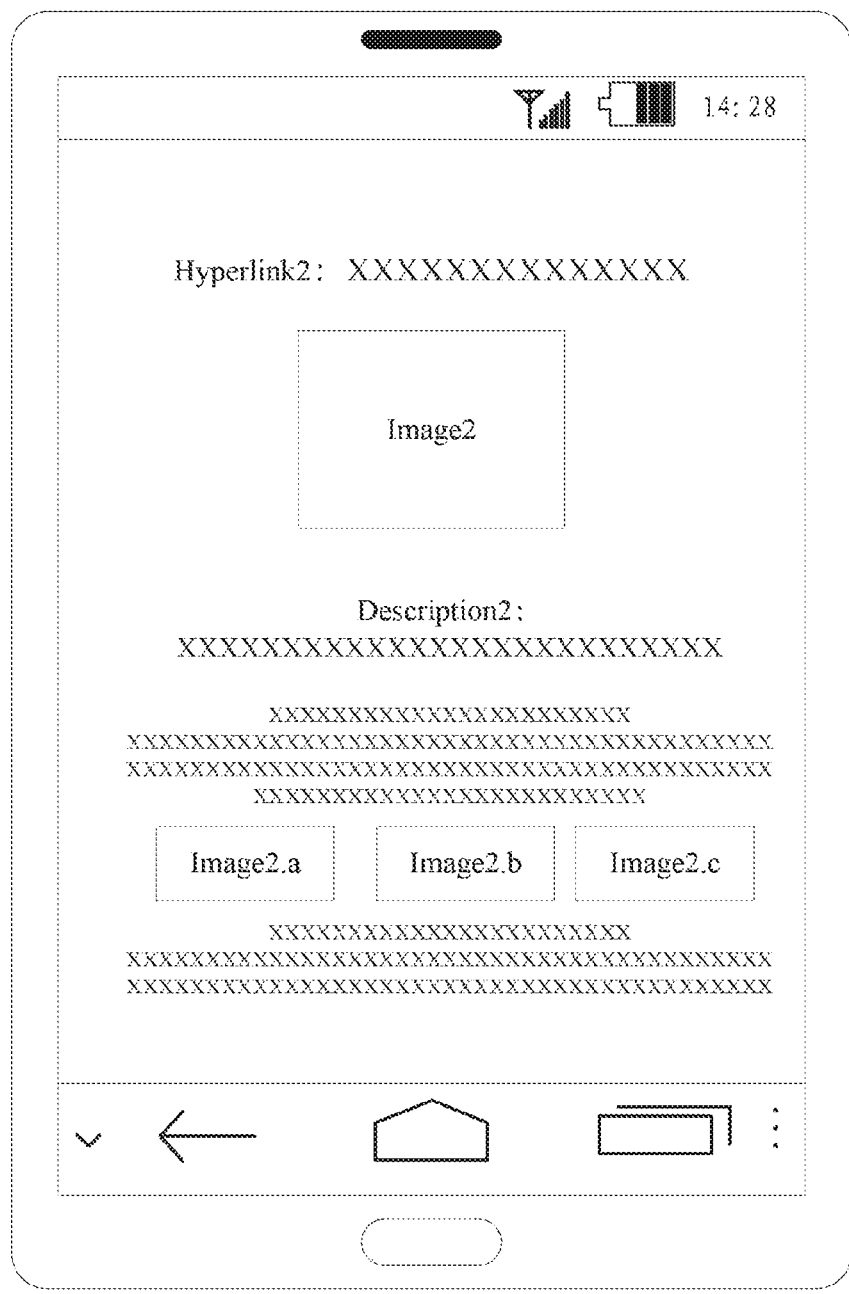
FIG. 3B is a schematic diagram of a display page of the method for displaying information according to some embodiments of the disclosure.

Please refer to FIG. 3B, FIG. 3B shows a schematic diagram of a display page of the method for displaying information according to the disclosure. When the "hyperlink 2" is clicked, a display page is displayed. The display page is used for displaying to-be-displayed information corresponding to the hyperlink 2.

Step 203: sending the URL to a first terminal device, the first terminal device used for generating a Quick Response (QR) code of the URL and displaying the QR code.

In the embodiment, based on the URL generated in the step 202, the electronic device may send the URL to a first terminal device, wherein the first terminal device is used for generating a QR code of the URL and displaying the QR code.

It should be noted that the technique for generating a QR code is widely researched and applied at present, and is not repeatedly described any more here.

Optionally, an incompatible QR code (for example, a QR code that can be recognized only by a specific application) may also be generated to prevent or allow the specific application to recognize the QR code.

In some optional implementations of the embodiment, an expiration duration (e.g., 5 minutes) may be set for a QR code. Here, the expiration duration of the QR code is a time length from generation to expiration of the QR code. When a QR code expires, the QR code cannot be recognized.

Step 204: determining, in response to receiving an information display request sent by a second terminal device for characterizing the second terminal device recognizing the QR code, whether the information display request meets a preset condition.

In the embodiment, the electronic device may determine, in response to receiving an information display request sent by a second terminal device for characterizing the second terminal device recognizing the QR code, whether the information display request meets a preset condition. The second terminal device scans and recognizes the QR code displayed by the first terminal device, and then may send the information display request to the electronic device. The information display request may include a cookie (data of a website stored on a local terminal of a user for identifying the user identity and conversation tracking). The electronic device may determine the device source and the device system using a device number (e.g., International Mobile Equipment Identity) or a user agent (UA) included in the cookie.

In some optional implementations of the embodiment, the information display request may include an application identifier of an application recognizing the QR code, and sending time of sending the information display request by the second terminal device; and the preset condition may include: the sending time being within a preset time range and the application identifier being a preset application identifier.

Here, the application identifier is used for identifying the application recognizing the QR code. As an example, the application identifier may be a user identifier of the Mobile Baidu application (i.e., an identifier for uniquely identifying a user of the Baidu application), or an identifier of a browser type (e.g., a UC browser, a QQ browser or a Go browser for a mobile terminal, or a Baidu browser or a 360 browser for a computer terminal). As will be appreciated, if the information display request includes a user identifier of the Mobile Baidu application, then the application recognizing the QR code may be determined as the Mobile Baidu.

As an example, the application identifier may be, e.g., a user identifier of the Mobile Baidu application, the sending time may be 10:00 on Oct. 14, 2017, the preset time range may be within 5 minutes (including 5 minutes) from the QR code generation time (e.g., 09:59 on Oct. 14, 2017), and the preset application may be the Mobile Baidu.

Step 205: sending a page display instruction to the second terminal device, in response to determining the information display request meeting the preset condition, wherein the second terminal device displays the target page in response to receiving the page display instruction and displays the to-be-displayed information in response to the hyperlink being clicked.

In the embodiment, the electronic device may send a page display instruction to the second terminal device, in response to determining the information display request meeting the preset condition. Here, the second terminal device displays the target page (e.g., a page shown in FIG. 3A) in response to receiving the page display instruction, and displays the to-be-displayed information (e.g., information including characters and an image displayed in FIG. 3B) in response to the hyperlink (e.g., the hyperlink 2 on the page shown in FIG. 3A) being clicked.

In some optional implementations of the embodiment, the sending a page display instruction to the second terminal device, in response to determining the information display request meeting the preset condition includes: the electronic device sends the page display instruction to the second terminal device, in response to determining the information display request meeting the preset condition, and in response to receiving a refresh request characterizing the second terminal device performing a refresh operation.

As an example, the electronic device sends the page display instruction to the second terminal device, if determining the information display request meeting the preset condition, and if receiving a refresh request characterizing the second terminal device performing a refresh operation.

In some optional implementations of the embodiment, the electronic device may further send the to-be-displayed information and a to-be-displayed information storing instruction to the second terminal device. The second terminal device may store the to-be-displayed information in a cache after receiving the to-be-displayed information storing instruction.

In some optional implementations of the embodiment, the electronic device may further send an instruction deleting the to-be-displayed information to the second terminal device after sending the page display instruction to the second terminal device. The second terminal device may display the target page after receiving the page display instruction, and then may delete the to-be-displayed information stored in the cache. As will be appreciated, after the second terminal device deletes the to-be-displayed information stored in the cache, the second terminal device may not display the to-be-displayed information when refreshing the page again if a QR code is recognized only once, i.e., the to-be-displayed information may be displayed only after first refreshing after recognizing the QR code. If the to-be-displayed information is required to be displayed again, the QR code needs to be recognized again.

Figure 4:
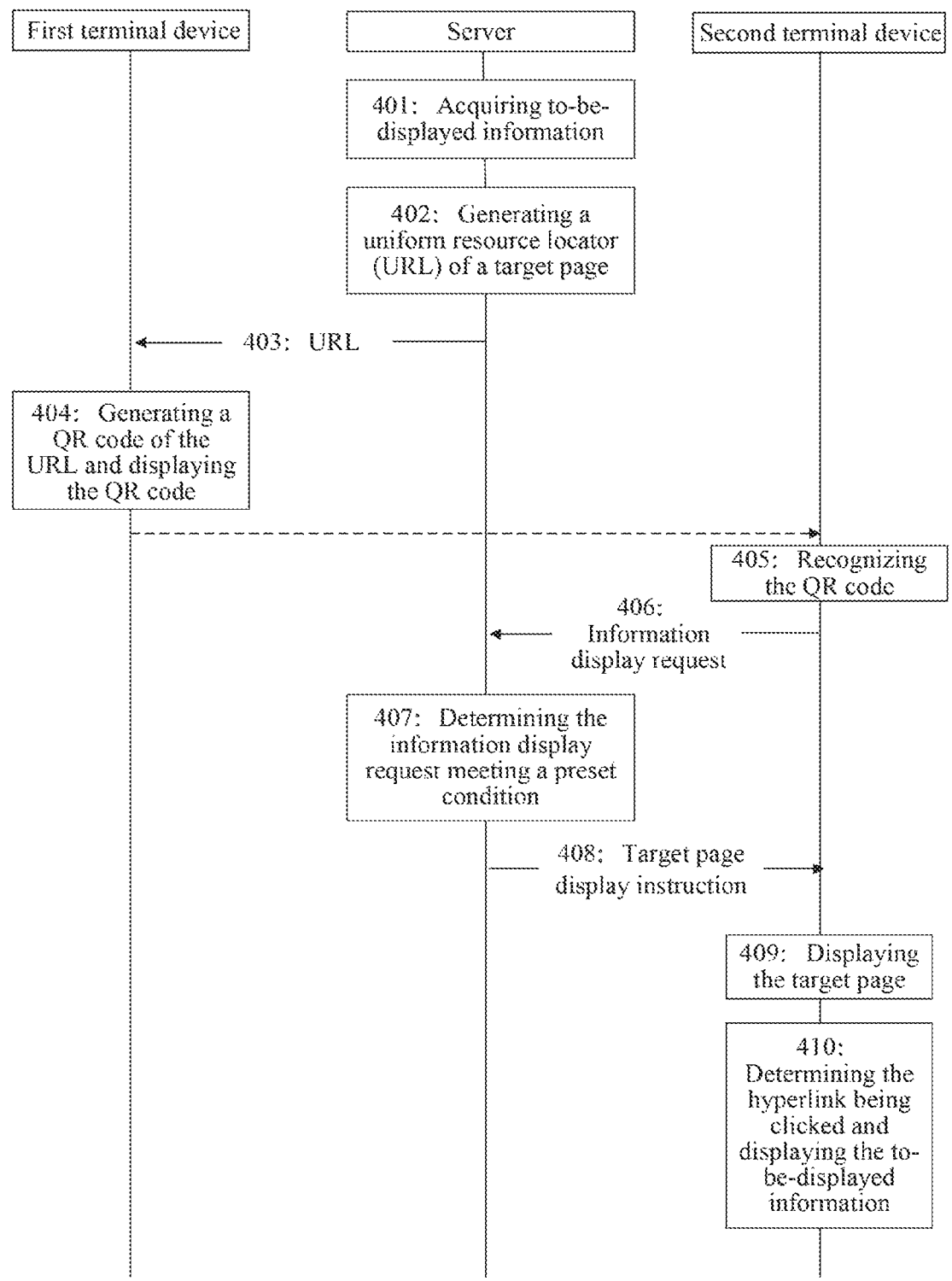
FIG. 4 is a signaling diagram of an application scenario of the method for displaying information according to some embodiments of the disclosure.

Please further refer to FIG. 4. FIG. 4 is a signaling diagram of an application scenario of the method for displaying information according to the embodiment. A dotted line in the diagram is used for characterizing the second terminal device recognizing the QR code displayed by the first terminal device.

Step 401: acquiring to-be-displayed information by a server.

Here, the server may acquire to-be-displayed information. The to-be-displayed information may be sent by a user to the electronic device through a terminal device, or pre-stored in the electronic device. The to-be-displayed information is selected by the user.

Step 402: generating a URL of a target page by the server.

Here, the server may generate a URL of a target page. Here, the target page may include a hyperlink linking to a display page of the to-be-displayed information.

Step 403: sending the URL to the first terminal device by the server.

Here, the server may send the URL to the first terminal device.

Step 404: generating a QR code of the URL and displaying the QR code by the first terminal device.

Here, the first terminal device may generate a QR code of the URL and display the QR code.

Step 405: recognizing the QR code by the second terminal device.

Here, the second terminal device may recognize the QR code.

Step 406: sending an information display request to the first terminal device by the second terminal device.

Here, the second terminal device may send an information display request to the first terminal device.

Step 407: determining the information display request meeting a preset condition by the server.

Here, the server may determine the information display request meeting a preset condition.

Step 408: sending a page display instruction to the second terminal device by the server.

Here, the server may send a page display instruction to the second terminal device.

Step 409: displaying the target page by the second terminal device.

Here, the second terminal device may display the target page.

Step 410: determining the hyperlink being clicked and displaying the to-be-displayed information by the second terminal device.

Here, the second terminal device may determine the hyperlink being clicked and display the to-be-displayed information.

The method provided by the above embodiments of the disclosure acquires to-be-displayed information, generates a URL of a target page, sends the URL to a first terminal device, then generates a QR code of the URL and displays the QR code by the first terminal device to enable a second terminal device to recognize the QR code and then send an information display request to the first terminal device, and then sends a page display instruction to the second terminal device if determining the information display request meeting a preset condition, wherein the second terminal device displays the target page, and displays the to-be-displayed information in response to determining the hyperlink being clicked, thereby improving the flexibility in information display.

Figure 5:
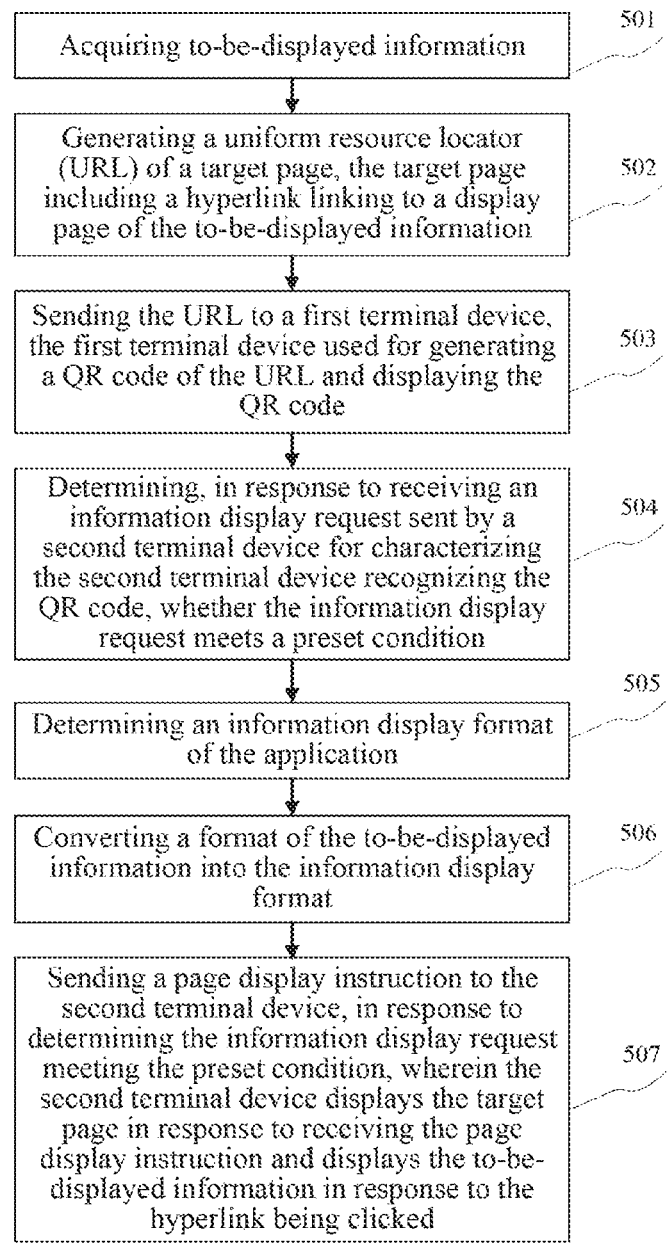
FIG. 5 is a flowchart of another embodiment of the method for displaying information according to the disclosure.

Please further refer to FIG. 5, FIG. 5 shows a flow 500 of another embodiment of the method for displaying information. The flow 500 of the method for displaying information includes the following steps.

Step 501: acquiring to-be-displayed information.

In the embodiment, an electronic device (e.g., the server shown in FIG. 1) in which the method for displaying information is performed may acquire to-be-displayed information. Here, the to-be-displayed information may be to-be-browsed information edited and inputted by a user, and selected by the user. The to-be-displayed information may be sent by the user to the electronic device through a terminal device, or pre-stored in the electronic device.

Step 502: generating a uniform resource locator (URL) of a target page, the target page including a hyperlink linking to a display page of the to-be-displayed information.

In the embodiment, the electronic device (e.g., the server shown in FIG. 1) may generate a URL of a target page, wherein the target page includes a hyperlink linking to a display page of the to-be-displayed information.

Here, the hyperlink may be displayed as a paragraph of text or an image. When a hyperlink is clicked, a link target (e.g., the display page in the embodiment of the disclosure) may be displayed, and operations, such as opening or running (e.g., if the link target is a web page, then an opening operation may be performed; and if the link target is an application, then a running operation may be performed) may be performed based on a type of the link target. Optionally, the to-be-displayed information may further include a hyperlink.

Step 503: sending the URL to a first terminal device, the first terminal device used for generating a QR code of the URL and displaying the QR code.

In the embodiment, based on the URL generated in the step 202, the electronic device may send the URL to a first terminal device, wherein the first terminal device is used for generating a QR code of the URL and displaying the QR code.

Step 504: determining, in response to receiving an information display request sent by a second terminal device for characterizing the second terminal device recognizing the QR code, whether the information display request meets a preset condition.

In the embodiment, the electronic device may determine, in response to receiving an information display request sent by a second terminal device for characterizing the second terminal device recognizing the QR code, whether the information display request meets a preset condition. The second terminal device scans and recognizes the QR code displayed by the first terminal device, and then may send the information display request to the electronic device.

Step 505: determining an information display format of the application.

In the embodiment, the electronic device may further determine an information display format of the application. The information display format may be a format of information displayed in the application (e.g., plotting position and font; image position and size; and line spacing, alignment type and font of text content).

Step 506: converting a format of the to-be-displayed information into the information display format.

In the embodiment, the electronic device may further convert a format of the to-be-displayed information into the information display format. As will be appreciated, converting the format of the to-be-displayed information into the information display format may enable to keep a uniform format and style between corresponding contents (for example, hyperlinks such as hyperlink 1, hyperlink 2 and hyperlink 3, images such as image 1, image 2 and image 3, and descriptions such as description 1, description 2 and description 3 shown in FIG. 3A) on the target page, and may also enable to keep a uniform format and style between display pages (for example, a display page displayed after the hyperlink 1 is clicked and a display page displayed after the hyperlink 2 is clicked shown in FIG. 3A).

Step 507: sending a page display instruction to the second terminal device, in response to determining the information display request meeting the preset condition, wherein the second terminal device displays the target page in response to receiving the page display instruction and displays the to-be-displayed information in response to the hyperlink being clicked.

In the embodiment, the electronic device may send a page display instruction to the second terminal device, in response to determining the information display request meeting the preset condition, wherein the second terminal device displays the target page (e.g., the page shown in FIG. 3A) in response to receiving the page display instruction and displays the to-be-displayed information (e.g., the information including characters and an image displayed in FIG. 3B) in response to the hyperlink (e.g., the hyperlink 2 on the page shown in FIG. 3A) being clicked. As will be appreciated, here, the format of the to-be-displayed information displayed by the second terminal device is converted.

As can be seen from FIG. 5, compared with the embodiment corresponding to FIG. 2, the flow 500 of the method for displaying information according to the embodiment highlights converting the format of the to-be-displayed information. Thus, the solution according to the embodiment may enable to keep a uniform format and style between pieces of information on the target page and keep a uniform format and style between presented display pages after hyperlinks are clicked, thereby realizing more flexible information display.

Figure 6:
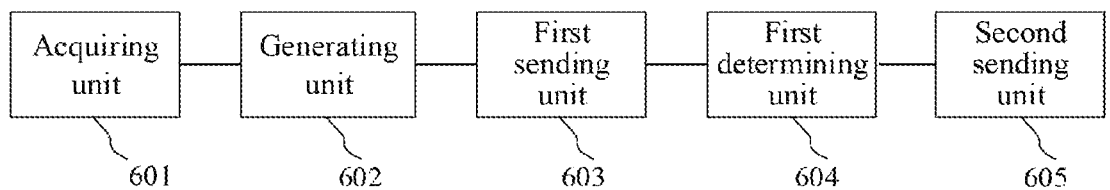
FIG. 6 is a structural schematic diagram of an embodiment of an apparatus for displaying information according to the disclosure.

Please further refer to FIG. 6. As an implementation of the method shown in the above figures, the disclosure provides an embodiment of an apparatus for displaying information. The embodiment of the apparatus corresponds to the embodiment of the method shown in FIG. 2. The apparatus may be specifically applied to a variety of electronic devices.

As shown in FIG. 6, an apparatus 600 for displaying information according to the embodiment includes: an acquiring unit 601, a generating unit 602, a first sending unit 603, a first determining unit 604, and a second sending unit 605. Here, the acquiring unit 601 is configured for acquiring to-be-displayed information; the generating unit 602 is configured for generating a URL of a target page, wherein the target page includes a hyperlink linking to a display page of the to-be-displayed information; the first sending unit 603 is configured for sending the URL to a first terminal device, wherein the first terminal device is used for generating a QR code of the URL and displaying the QR code; the first determining unit 604 is configured for determining, in response to receiving an information display request sent by a second terminal device for characterizing the second terminal device recognizing the QR code, whether the information display request meets a preset condition; and the second sending unit 605 is configured for sending a page display instruction to the second terminal device, in response to determining the information display request meeting the preset condition, wherein the second terminal device displays the target page in response to receiving the page display instruction and displays the to-be-displayed information in response to the hyperlink being clicked.

In the embodiment, the acquiring unit 601 of the apparatus 600 for displaying information may acquire to-be-displayed information. Here, the to-be-displayed information may be sent by a user to the apparatus through a terminal device, or pre-stored in the apparatus. The to-be-displayed information is selected by the user.

In the embodiment, the generating unit 602 may generate a URL of a target page, wherein the target page includes a hyperlink linking to a display page of the to-be-displayed information. Here, the hyperlink may be displayed as a paragraph of text or an image, or the like. When a hyperlink is clicked, a link target (e.g., the display page in the embodiment of the disclosure) will be displayed, and operations, such as opening or running will be performed based on a type of the link target.

In the embodiment, the first sending unit 603 may send the URL to the first terminal device, wherein the first terminal device is used for generating a QR code of the URL and displaying the QR code.

In the embodiment, the first determining unit 604 may determine, in response to receiving an information display request sent by a second terminal device for characterizing the second terminal device recognizing the QR code, whether the information display request meets a preset condition. The second terminal device scans and recognizes the QR code displayed by the first terminal device, and then may send the information display request to the apparatus.

In the embodiment, the second sending unit 605 may send a page display instruction to the second terminal device, in response to determining the information display request meeting the preset condition, wherein the second terminal device displays the target page (e.g., the page shown in FIG. 3A) in response to receiving the page display instruction and displays the to-be-displayed information (e.g., the information including characters and an image displayed in FIG. 3B) in response to the hyperlink (e.g., the hyperlink 2 on the page shown in FIG. 3A) being clicked.

In some optional implementations of the embodiment, the information display request includes an application identifier of an application recognizing the QR code, and sending time of sending the information display request by the second terminal device; and the preset condition includes:

the sending time being within a preset time range and the application identifier being a preset application identifier.

Here, the application identifier is used for identifying the application of the QR code. As an example, the application identifier may be a user identifier of the Mobile Baidu application (i.e., an identifier for uniquely identifying the user of the Baidu application).

In some optional implementations of the embodiment, the apparatus further includes: a second determining unit, configured for determining an information display format of the application; and a conversion unit, configured for converting a format of the to-be-displayed information into the information display format.

The information display format may be a format of information displayed in the application (e.g., plotting position and font; image position and size; and line spacing, alignment type and font of text content).

In some optional implementations of the embodiment, the second sending unit includes: a sending module, configured for sending the page display instruction to the second terminal device, in response to determining the information display request meeting the preset condition, and in response to receiving a refresh request characterizing the second terminal device performing a refresh operation.

As an example, if the first determining unit 604 determines the information display request meeting the preset condition, and receives a refresh request characterizing the second terminal device performing the refresh operation, the second sending unit may send the page display instruction to the second terminal device.

In some optional implementations of the embodiment, the apparatus further includes: a third sending unit, configured for sending an instruction deleting the to-be-displayed information to the second terminal device. The second terminal device may display the target page after receiving the page display instruction, and then may delete the to-be-displayed information stored in the cache.

The apparatus provided by the above embodiments of the disclosure acquires to-be-displayed information by the acquiring unit 601; then generates a URL of a target page by the generating unit 602, wherein the target page includes a hyperlink linking to a display page of the to-be-displayed information; then sends the URL to a first terminal device by the first sending unit 603 to generate a QR code of the URL and display the QR code; determines, in response to receiving an information display request sent by a second terminal device for characterizing the second terminal device recognizing the QR code, whether the information display request meets a preset condition by the first determining unit 604; and finally sends a page display instruction to the second terminal device by the second sending unit 605, in response to determining the information display request meeting the preset condition, wherein the second terminal device displays the target page in response to receiving the page display instruction and displays the to-be-displayed information in response to the hyperlink being clicked, thereby realizing displaying feed information in real time, and improving the flexibility in information display.

Figure 7:
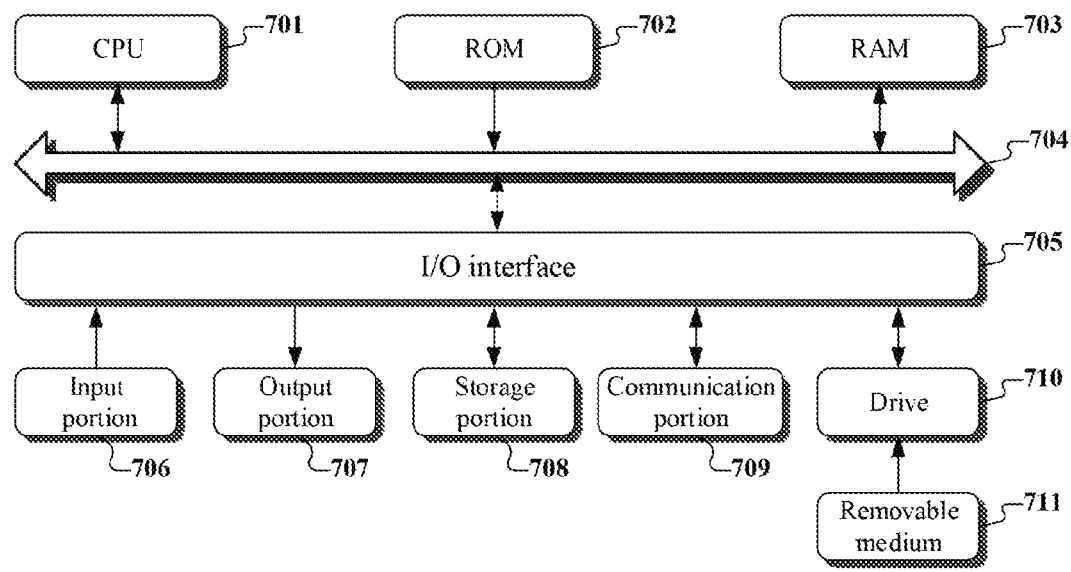
FIG. 7 is a structural schematic diagram of a computer system adapted to implement a server according to an embodiment of the disclosure.

Referring to FIG. 7, a schematic structural diagram of a computer system 700 adapted to implement a server of the embodiments of the present disclosure is shown. The server shown in FIG. 7 is merely an example, and should not bring any limitations to the functions and the scope of use of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 709, and/or may be installed from the removable media 711. The computer program, when executed by the central processing unit (CPU) 701, implements the above mentioned functionalities as defined by the methods of some embodiments of the present disclosure.

It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising an acquiring unit, a generating unit, a first sending unit, a first determining unit, and a second sending unit, where the names of these units do not in some cases constitute a limitation to such units themselves. For example, the acquiring unit may also be described as "a unit for acquiring to-be-displayed information".

In another aspect, the present disclosure further provides a computer-readable storage medium. The computer-readable storage medium may be the computer storage medium included in the server in the above described embodiments, or a stand-alone computer-readable storage medium not assembled into the server. The computer-readable storage medium stores one or more programs. The one or more programs, when executed by a server, cause the server to: acquiring to-be-displayed information; generating a uniform resource locator (URL) of a target page, the target page including a hyperlink linking to a display page of the to-be-displayed information; sending the URL to a first terminal device, the first terminal device used for generating a quick response (QR) code of the URL and displaying the QR code; determining, in response to receiving an information display request sent by a second terminal device for characterizing the second terminal device recognizing the QR code, whether the information display request meets a preset condition; and sending a page display instruction to the second terminal device, in response to determining the information display request meeting the preset condition, wherein the second terminal device displays the target page in response to receiving the page display instruction and displays the to-be-displayed information in response to the hyperlink being clicked.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for displaying information, comprising:
    acquiring to-be-displayed information;
    generating a uniform resource locator (URL) of a target page, the target page including a hyperlink linking to a display page of the to-be-displayed information;
    sending the URL to a first terminal device, the first terminal device used for generating a quick response (QR) code of the URL and displaying the QR code;
    determining, in response to receiving an information display request sent by a second terminal device for characterizing the second terminal device recognizing the QR code, whether the information display request meets a preset condition; and
    sending a page display instruction to the second terminal device, in response to determining the information display request meeting the preset condition, wherein the second terminal device displays the target page in response to receiving the page display instruction and displays the to-be-displayed information in response to the hyperlink being clicked,
    wherein the method is performed by at least one processor.

2. The method according to claim 1, wherein the information display request comprises an application identifier of an application recognizing the QR code, and sending time of sending the information display request by the second terminal device; and
    the preset condition comprises: the sending time being within a preset time range and the application identifier being a preset application identifier.

3. The method according to claim 1, wherein after the determining the information display request meeting a preset condition, and before the sending a page display instruction to the second terminal device in response to determining the information display request meeting the preset condition, the method further comprises:
    determining an information display format of the application; and
    converting a format of the to-be-displayed information into the information display format.

4. The method according to claim 1, wherein the sending a page display instruction to the second terminal device, in response to determining the information display request meeting the preset condition comprises:
    sending the page display instruction to the second terminal device, in response to determining the information display request meeting the preset condition, and in response to receiving a refresh request characterizing the second terminal device performing a refresh operation.

5. The method according to claim 1, after the sending a page display instruction to the second terminal device, the method further comprises:
    sending an instruction deleting the to-be-displayed information to the second terminal device.

6. An apparatus for displaying information, comprising:
at least one processor; and
a memory storing instructions, the instructions when executed by the at least one processor, cause the at least one processor to perform operations, the operations comprising:
acquiring to-be-displayed information;
generating a uniform resource locator (URL) of a target page, the target page including a hyperlink linking to a display page of the to-be-displayed information;
sending the URL to a first terminal device, the first terminal device used for generating a quick response (QR) code of the URL and displaying the QR code;
determining, in response to receiving an information display request sent by a second terminal device for characterizing the second terminal device recognizing the QR code, whether the information display request meets a preset condition; and
sending a page display instruction to the second terminal device, in response to determining the information display request meeting the preset condition, wherein the second terminal device displays the target page in response to receiving the page display instruction and displays the to-be-displayed information in response to the hyperlink being clicked.

7. The apparatus according to claim 6, wherein the information display request comprises an application identifier of an application recognizing the QR code, and sending time of sending the information display request by the second terminal device; and
the preset condition comprises: the sending time being within a preset time range and the application identifier being a preset application identifier.

8. The apparatus according to claim 6, the operations further comprising:
determining an information display format of the application; and
converting a format of the to-be-displayed information into the information display format.

9. The apparatus according to claim 6, wherein the sending a page display instruction to the second terminal device, in response to determining the information display request meeting the preset condition comprises:
sending the page display instruction to the second terminal device, in response to determining the information display request meeting the preset condition, and in response to receiving a refresh request characterizing the second terminal device performing a refresh operation.

10. The apparatus according to claim 6, the operations further comprising:
sending an instruction deleting the to-be-displayed information to the second terminal device.

11. A non-transitory computer storage medium storing a computer program, the computer program when executed by one or more processors, causes the one or more processors to perform operations, the operations comprising:
acquiring to-be-displayed information;
generating a uniform resource locator (URL) of a target page, the target page including a hyperlink linking to a display page of the to-be-displayed information;
sending the URL to a first terminal device, the first terminal device used for generating a quick response (QR) code of the URL and displaying the QR code;
determining, in response to receiving an information display request sent by a second terminal device for characterizing the second terminal device recognizing the QR code, whether the information display request meets a preset condition; and
sending a page display instruction to the second terminal device, in response to determining the information display request meeting the preset condition, wherein the second terminal device displays the target page in response to receiving the page display instruction and displays the to-be-displayed information in response to the hyperlink being clicked.

* * * * *